(12) United States Patent
Morino et al.

(10) Patent No.: US 11,965,729 B2
(45) Date of Patent: Apr. 23, 2024

(54) CONFOCAL SENSOR

(71) Applicant: OMRON Corporation, Kyoto (JP)

(72) Inventors: Hisayasu Morino, Fukuchiyama (JP); Jun Takashima, Uji (JP)

(73) Assignee: OMRON Corporation, Kyoto (JP)

( * ) Notice: Subject to any disclaimer, the term of this patent is extended or adjusted under 35 U.S.C. 154(b) by 548 days.

(21) Appl. No.: 17/294,693

(22) PCT Filed: Nov. 21, 2019

(86) PCT No.: PCT/JP2019/045611
§ 371 (c)(1),
(2) Date: May 18, 2021

(87) PCT Pub. No.: WO2020/129533
PCT Pub. Date: Jun. 25, 2020

(65) Prior Publication Data
US 2022/0011092 A1 Jan. 13, 2022

(30) Foreign Application Priority Data

Dec. 20, 2018 (JP) .................................. 2018-238524

(51) Int. Cl.
*G01B 11/02* (2006.01)
*G01J 1/04* (2006.01)

(52) U.S. Cl.
CPC .......... *G01B 11/026* (2013.01); *G01J 1/0411* (2013.01); *G01B 2210/50* (2013.01)

(58) Field of Classification Search
CPC .......... G01B 11/026; G01B 2210/50; G01B 11/028; G01B 11/0608; G01B 11/002;

(Continued)

(56) References Cited

U.S. PATENT DOCUMENTS

| 4,585,349 A | 4/1986 | Gross et al. |
| 6,313,915 B1 | 11/2001 | Yanagisawa et al. |

(Continued)

FOREIGN PATENT DOCUMENTS

| CN | 102679880 | 9/2012 |
| CN | 107976145 | 5/2018 |

(Continued)

OTHER PUBLICATIONS

"International Search Report (Form PCT/ISA/210) of PCT/JP2019/045611," dated Feb. 4, 2020, with English translation thereof, pp. 1-4.

(Continued)

*Primary Examiner* — Isiaka O Akanbi
(74) *Attorney, Agent, or Firm* — JCIPRNET (57) ABSTRACT

Provided is a confocal sensor having a wider measuring range. A confocal sensor 1 comprises: a light source 10 that emits light at a plurality of wavelengths; a diffractive lens 130 that causes a chromatic aberration with respect to the light along an optical axis and focuses the light onto an object 200 without another intervening lens; a pinhole 120 through which reflected light passes, the reflected light being a portion of the light that was focused onto and reflected from the object 200 and focused by the diffractive lens 130; and a measuring unit 40 that measures the distance from the diffractive lens 130 to the object 200 on the basis of a wavelength of the reflected light. A distance L2 from the pinhole 120 to the diffractive lens 130 is variable.

11 Claims, 9 Drawing Sheets

(58) Field of Classification Search
CPC . G01J 1/0411; G02B 21/0016; G02B 21/0032
USPC .................................. 356/328, 317, 326, 437
See application file for complete search history.

(56) References Cited

U.S. PATENT DOCUMENTS

| | | | | |
|---|---|---|---|---|
| 6,628,385 | B1* | 9/2003 | Osipchuk | G02B 21/18 |
| | | | | 356/417 |
| 6,657,216 | B1 | 12/2003 | Poris | |
| 8,194,251 | B2* | 6/2012 | Emtman | G01B 11/14 |
| | | | | 356/612 |
| 8,736,839 | B2 | 5/2014 | Heo et al. | |
| 2010/0171955 | A1 | 7/2010 | Suga et al. | |
| 2010/0265519 | A1 | 10/2010 | Takimasa et al. | |
| 2014/0218730 | A1 | 8/2014 | Yamazaki et al. | |
| 2017/0010453 | A1* | 1/2017 | Imoto | G02B 21/0076 |
| 2017/0160130 | A1* | 6/2017 | Morino | G02B 6/3624 |
| 2017/0276544 | A1* | 9/2017 | Gastaldo | G01B 11/022 |
| 2018/0259390 | A1* | 9/2018 | Marukawa | G01J 3/2803 |
| 2019/0101375 | A1* | 4/2019 | Morino | G02B 21/0064 |
| 2019/0101646 | A1* | 4/2019 | Tomago | G01B 11/026 |
| 2019/0277621 | A1* | 9/2019 | Okuda | G01B 9/02042 |

FOREIGN PATENT DOCUMENTS

| | | |
|---|---|---|
| CN | 109310328 | 2/2019 |
| EP | 1714109 | 7/2007 |
| EP | 2500685 | 9/2012 |
| JP | 2004286608 | 10/2004 |
| JP | 2005077390 | 3/2005 |
| JP | 2005214905 | 8/2005 |
| JP | 2008286624 | 11/2008 |
| JP | 2012208102 | 10/2012 |
| JP | 2014153092 | 8/2014 |
| JP | 2018119907 | 8/2018 |
| TW | 200730793 | 8/2007 |
| TW | 201420991 | 6/2014 |
| TW | 201721087 | 6/2017 |
| TW | 201732216 | 9/2017 |
| TW | 201802433 | 1/2018 |
| WO | 2005078383 | 8/2005 |
| WO | 2017165793 | 9/2017 |
| WO | 2018147631 | 8/2018 |

OTHER PUBLICATIONS

"Written Opinion of the International Searching Authority (Form PCT/ISA/237) of PCT/ JP2019/045611," dated Feb. 4, 2020, with English translation thereof, pp. 1-6.

"Office Action of China Counterpart Application" with English translation thereof, dated Apr. 27, 2022, p. 1-p. 22.

"Search Report of Europe Counterpart Application", dated Jul. 22, 2022, pp. 1-5.

"Office Action of China Counterpart Application" with English translation thereof, dated Oct. 17, 2022, p. 1-p. 29.

* cited by examiner

CONFOCAL SENSOR

CROSS-REFERENCE TO RELATED APPLICATION

This application is a 371 application of the International PCT application serial no. PCT/JP2019/045611, filed on Nov. 21, 2019, which claims the priority benefits of Japan Patent Application No. 2018-238524, filed on Dec. 20, 2018. The entirety of each of the above-mentioned patent applications is hereby incorporated by reference herein and made a part of this specification.

BACKGROUND

Technical Field

The disclosure relates to a confocal sensor.

Description of Related Art

Conventionally, a confocal sensor has been used, which generates a chromatic aberration along an optical axis by a confocal optical system with respect to light emitted from a light source and utilizes that the wavelength of the converged light changes corresponding to a distance to an object to measure the distance to the object.

Patent Document 1 below describes a device including a means for generating a multicolored light beam and at least one lens for converging light rays at the respective wavelengths on the respective focal points.

Further, Patent Document 2 below describes a confocal height measuring device, which is composed of a confocal microscope that images illumination light from a light source on a sample via an objective lens from a disk having a predetermined pattern portion and, with light from the sample again incident on an imaging means via the disk from the objective lens, obtains an observed image of the sample. The confocal height measuring device uses position correction data in the optical axis direction, which results from at least one of the tilt of the disk with respect to the optical axis of the objective lens, the tilt of a stage on which the sample is mounted, and the field curvature of the objective lens, to correct height information obtained by the confocal microscope.

RELATED ART

Patent Documents

[Patent Document 1] U.S. Pat. No. 4,585,349
[Patent Document 2] Japanese Laid-Open No. 2004-286608

SUMMARY

Problems to be Solved

By using the conventional confocal sensor, it is possible to measure the distance to the object with a resolution of several nm. However, the measuring range of the conventional confocal sensor may be limited to a range of several mm in the front-back direction centered on a point of several tens of mm from the front surface of the sensor head.

Therefore, the invention provides a confocal sensor having a wider measuring range.

Means for Solving the Problems

A confocal sensor according to one aspect of the disclosure includes: a light source that emits light at a plurality of wavelengths; a diffractive lens that generates a chromatic aberration with respect to the light along an optical axis direction and converges the light on an object without another intervening lens; a pinhole through which reflected light passes, the reflected light being a portion of the light focused on and reflected by the object and converged by the diffractive lens; and a measuring unit that measures a distance from the diffractive lens to the object based on a wavelength of the reflected light, and a distance from the pinhole to the diffractive lens is variable.

According to this aspect, by changing the distance from the pinhole to the diffractive lens, the measurable range can be changed, and the distance to the object can be measured in a wider range.

In the above aspect, the confocal sensor may further include a mechanism that continuously changes the distance from the pinhole to the diffractive lens.

According to this aspect, the measuring range can be continuously changed by continuously changing the distance from the pinhole to the diffractive lens.

In the above aspect, a plurality of types of holders for housing the diffractive lens at different positions may be replaceable.

According to this aspect, the measuring range can be changed stepwise by replacing multiple types of holders.

In the above aspect, the measuring unit may measure the distance from the diffractive lens to the object according to a non-linear relationship between the wavelength of the reflected light and the distance from the diffractive lens to the object.

According to this aspect, by using the non-linear relationship between the wavelength of the reflected light and the distance from the diffractive lens to the object, the measuring range can be expanded as compared with the case of using a linear relationship.

In the above aspect, when the wavelength of the reflected light is represented by $\lambda$, the distance from the diffractive lens to the object is represented by L1, the distance from the pinhole to the diffractive lens is represented by L2, and a focal length of the diffractive lens with respect to a reference wavelength $\lambda_0$ is represented by $f_0$, the non-linear relationship may be represented by:

$$L1 = \frac{\lambda_0 f_0 L2}{L2\lambda - f_0 \lambda_0}. \qquad [\text{Formula 1}]$$

According to this aspect, by changing the distance from the pinhole to the diffractive lens, the non-linear relationship between the wavelength of the reflected light and the distance from the diffractive lens to the object can be changed, and the measuring range can be further expanded.

In the above aspect, the measuring unit may measure the distance from the diffractive lens to the object according to the non-linear relationship estimated based on measured values of the wavelength of the reflected light and the distance from the diffractive lens to the object.

According to this aspect, the non-linear relationship between the wavelength of the reflected light and the distance from the diffractive lens to the object can be corrected based on the measured values, and the distance from the diffractive lens to the object can be measured more accurately.

In the above aspect, the measuring unit may determine whether the object is located within a predetermined range based on the wavelength.

According to this aspect, whether the position of the object is appropriate can be determined.

In the above aspect, the confocal sensor may further include: an input unit that accepts input of a wavelength resolution required; and an output unit that outputs ranges of the distance from the diffractive lens to the object and the distance from the pinhole to the diffractive lens that satisfy the wavelength resolution.

According to this aspect, while achieving the required wavelength resolution, it is possible to grasp in what range the diffractive lens can be moved or the positional relationship between the object and the sensor head can be changed.

Effects

According to the invention, a confocal sensor having a wider measuring range is provided.

DESCRIPTION OF THE EMBODIMENTS

Hereinafter, an embodiment according to one aspect of the invention (hereinafter, referred to as "the present embodiment") will be described with reference to the drawings. In each drawing, parts having the same reference numerals have the same or similar configurations.

Configuration Example

Figure 1:
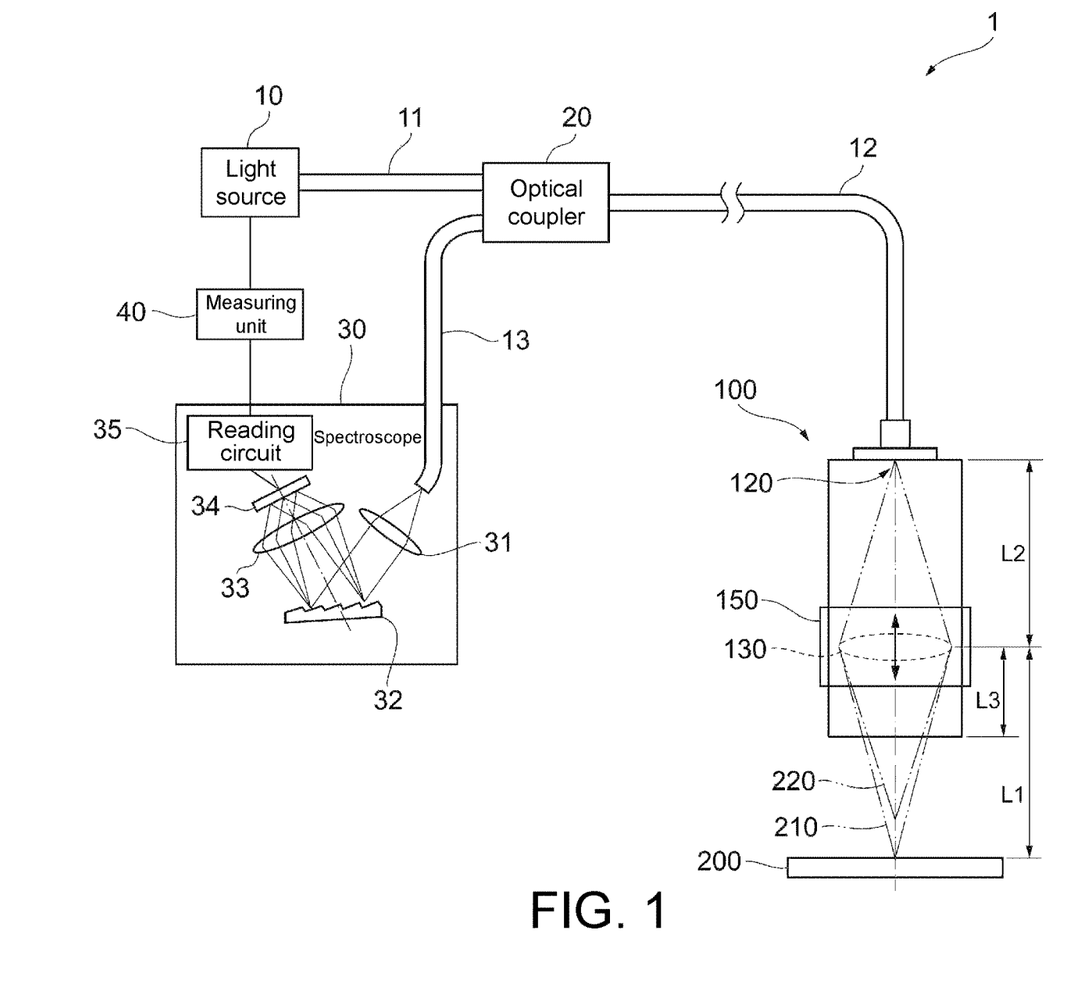
FIG. 1 is a diagram showing an outline of a confocal sensor according to an embodiment of the invention.

FIG. 1 is a diagram showing an outline of a confocal sensor 1 according to an embodiment of the invention. The confocal sensor 1 according to the present embodiment is a device that measures the position of an object 200, and includes a light source 10, a first optical fiber 11, a second optical fiber 12, a third optical fiber 13, an optical coupler 20, a spectroscope 30, a measuring unit 40, and a sensor head 100.

The light source 10 emits light at a plurality of wavelengths. The light source 10 may emit white light, and outputs the light to the first optical fiber 11. The light source 10 may adjust the amount of the white light based on a command of the measuring unit 40. The first optical fiber 11 may be any optical fiber, and may be, for example, a refractive index distribution type fiber having a core diameter of 50 μm. The first optical fiber 11 may be connected to a fiber having a smaller core diameter before being connected to the optical coupler 20.

The optical coupler 20 connects the first optical fiber 11, the second optical fiber 12, and the third optical fiber 13, and transmits light from the first optical fiber 11 to the second optical fiber 12 and transmits light from the second optical fiber 12 to the third optical fiber 13.

The sensor head 100 is connected to the second optical fiber 12 and houses a diffractive lens 130 that generates a chromatic aberration with respect to the light along an optical axis and converges the light on the object 200 without another intervening lens. In this example, light 210 at a first wavelength having a relatively long focal length and light 220 at a second wavelength having a relatively short focal length are shown. In the case of this example, the light 210 at the first wavelength is focused on the object 200, but the light 220 at the second wavelength is focused in front of the object 200.

The light reflected on a surface of the object 200 is converged by the diffractive lens 130 and returned to a pinhole 120 which is a core of the second optical fiber 12. The pinhole 120 allows reflected light to pass through, and the reflected light is a portion of the light focused and reflected on the object 200 and converged by the diffractive lens 130. Among the reflected light, the light 210 at the first wavelength is focused by the pinhole 120 provided on an end surface of the second optical fiber 12 and therefore most of the light 210 enters the second optical fiber 12, but light at other wavelengths is not focused at the pinhole 120 and most of it does not enter the second optical fiber 12. The reflected light entering the second optical fiber 12 is transmitted to the third optical fiber 13 via the optical coupler 20 and input to the spectroscope 30. The reflected light entering the second optical fiber 12 is also transmitted to the first optical fiber 11 via the optical coupler 20, but is terminated at the light source 10.

The spectroscope 30 is connected to the third optical fiber 13 and acquires the reflected light reflected by the object 200 and converged by the sensor head 100 via the second optical fiber 12, the optical coupler 20, and the third optical fiber 13, and measures the spectrum of the reflected light. The spectroscope 30 includes a first lens 31 that collects the reflected light emitted from the third optical fiber 13, a diffraction grating 32 that disperses the reflected light, a second lens 33 that collects the dispersed reflected light, a light receiving element 34 that receives the dispersed reflected light, and a reading circuit 35 that reads a light receiving signal of the light receiving element 34. The reading circuit 35 reads the wavelength and amount of the received light based on the light receiving signal of the light receiving element 34.

The measuring unit 40 measures a distance L1 from the diffractive lens 130 to the object 200 based on the wavelength of the reflected light. In the case of this example, the light 210 at the first wavelength is read as a peak by the reading circuit 35, and the measuring unit 40 calculates a position corresponding to the first wavelength.

In the confocal sensor 1 according to the present embodiment, a distance L2 from the pinhole 120 to the diffractive lens 130 is variable. Conventionally, the distance L2 from the pinhole 120 to the diffractive lens 130 is fixed, and the chromatic aberration is linearly corrected by another lens. Therefore, the distance L2 is not assumed to be changed, and the measuring range of the confocal sensor 1 cannot be arbitrarily expanded or reduced. In the confocal sensor 1 according to the present embodiment, the distance L2 from the pinhole 120 to the diffractive lens 130 is variable, by which the measurable range can be changed, and the confocal sensor 1 can measure the distance to the object 200 in a wider range.

The sensor head 100 includes a mechanism that continuously changes the distance L2 from the pinhole 120 to the diffractive lens 130. Specifically, the sensor head 100 includes a variable mechanism 150 that continuously moves the diffractive lens 130 in a direction along the optical axis. The variable mechanism 150 may have a means for reading the position of the diffractive lens 130, and may transmit the distance L2 from the pinhole 120 to the diffractive lens 130 or the distance L3 from the diffractive lens 130 to the entire surface of the sensor head 100 to the measuring unit 40. The measuring range can be continuously changed by continuously changing the distance L2 from the pinhole 120 to the diffractive lens 130 with the variable mechanism 150.

Figure 2:
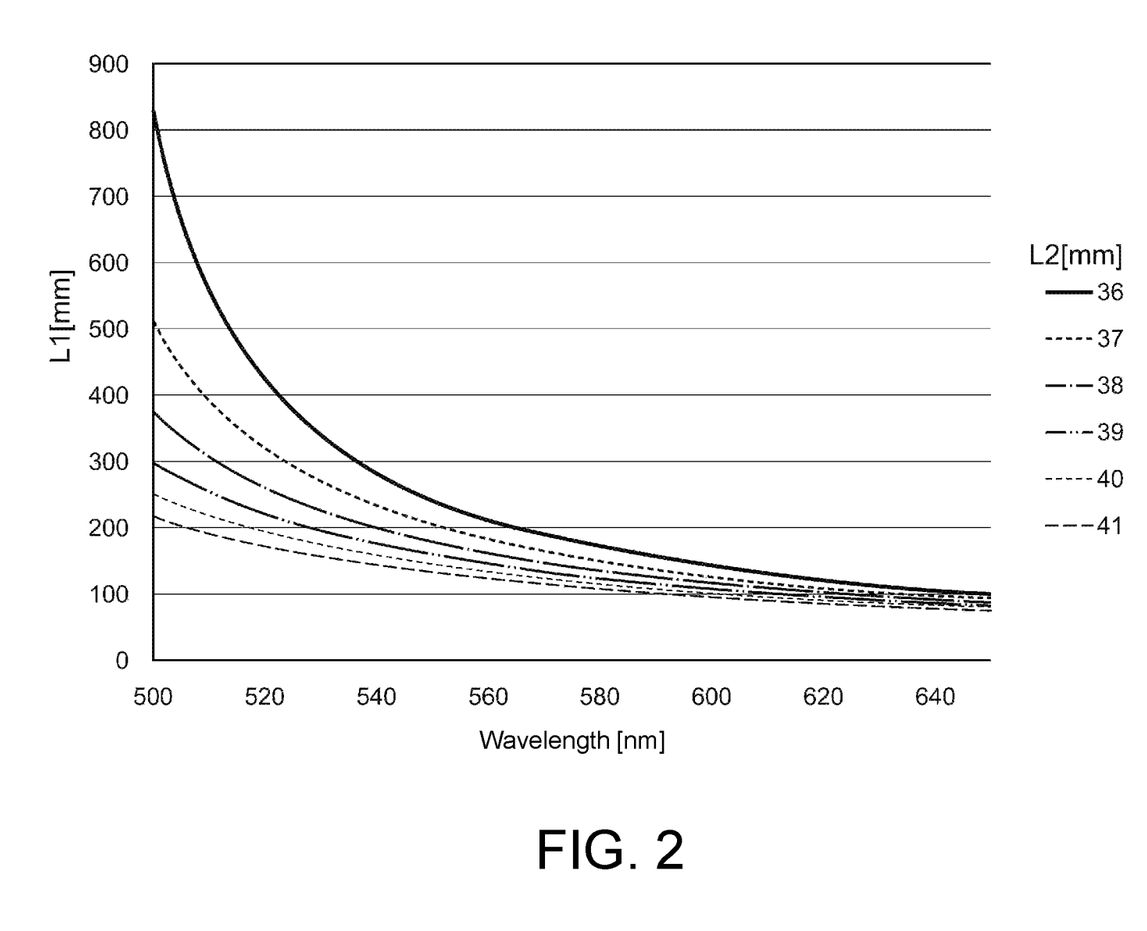
FIG. 2 is a diagram showing a relationship between a distance from a diffractive lens to an object and a wavelength of reflected light of the confocal sensor according to the present embodiment.

FIG. 2 is a diagram showing a relationship between the distance L1 from the diffractive lens 130 to the object 200 and the wavelength of the reflected light of the confocal sensor 1 according to the present embodiment. In the figure, the distance L1 from the diffractive lens 130 to the object 200 is shown on the vertical axis in mm, and the wavelength of the reflected light is shown on the horizontal axis in nm. Further, in the figure, the case where the distance L2 from the pinhole 120 to the diffractive lens 130 is 36 mm is shown by a solid line, the case of L2=37 mm is shown by a broken line, the case of L2=38 mm is shown by a one-dot chain line, the case of L2=39 mm is shown by a two-dot chain line, the case of L2=40 mm is shown by a dotted line, and the case of L2=41 mm is shown by a long broken line.

According to the figure, it can be read that as the wavelength of the reflected light becomes longer, the corresponding distance L1 becomes shorter. Further, it can be read that the change of the distance L1 when the wavelength of the reflected light changes by one unit increases as the wavelength of the reflected light becomes shorter. Furthermore, it can be read that the change of the distance L1 when the wavelength of the reflected light changes by one unit increases as the distance L2 from the pinhole 120 to the diffractive lens 130 becomes shorter.

The measuring unit 40 of the confocal sensor 1 according to the present embodiment may measure the distance from the diffractive lens 130 to the object 200 according to a non-linear relationship between the wavelength of the reflected light and the distance L1 from the diffractive lens 130 to the object 200. For the conventional confocal sensor, the non-linear relationship between the wavelength of the reflected light and the distance L1 from the diffractive lens 130 to the object 200 may be corrected by another lens to obtain a linear relationship. With such a correction, the resolution of the distance L1 can be made almost independent of the wavelength. However, when the corresponding relationship between the wavelength of the reflected light and the distance L1 is linear, the measuring range is limited to a narrow range. By utilizing the non-linear relationship between the wavelength of the reflected light and the distance L1, the confocal sensor 1 according to the present embodiment can expand the measuring range particularly in the short wavelength region, as compared with the case of utilizing the linear relationship, to widen the measuring range of the confocal sensor 1.

More specifically, when the wavelength of the reflected light is represented by $\lambda$, the distance from the diffractive lens 130 to the object 200 is represented by L1, the distance from the pinhole 120 to the diffractive lens 130 is represented by L2, and the focal length of the diffractive lens 130 with respect to a reference wavelength Xo is represented by $f_0$, the non linearity non-linear relationship with the distance L1 from the diffractive lens 130 to the object 200 is represented by the following formula (2).

$$L1 = \frac{\lambda_0 f_0 L2}{L2\lambda - f_0 \lambda_0} \qquad \text{[Formula 2]}$$

By changing the distance from the pinhole 120 to the diffractive lens 130 in this way, the non-linear relationship between the wavelength 2 of the reflected light and the distance L1 from the diffractive lens 130 to the object 200 can be changed, and the measuring range can be further expanded.

Figure 3:
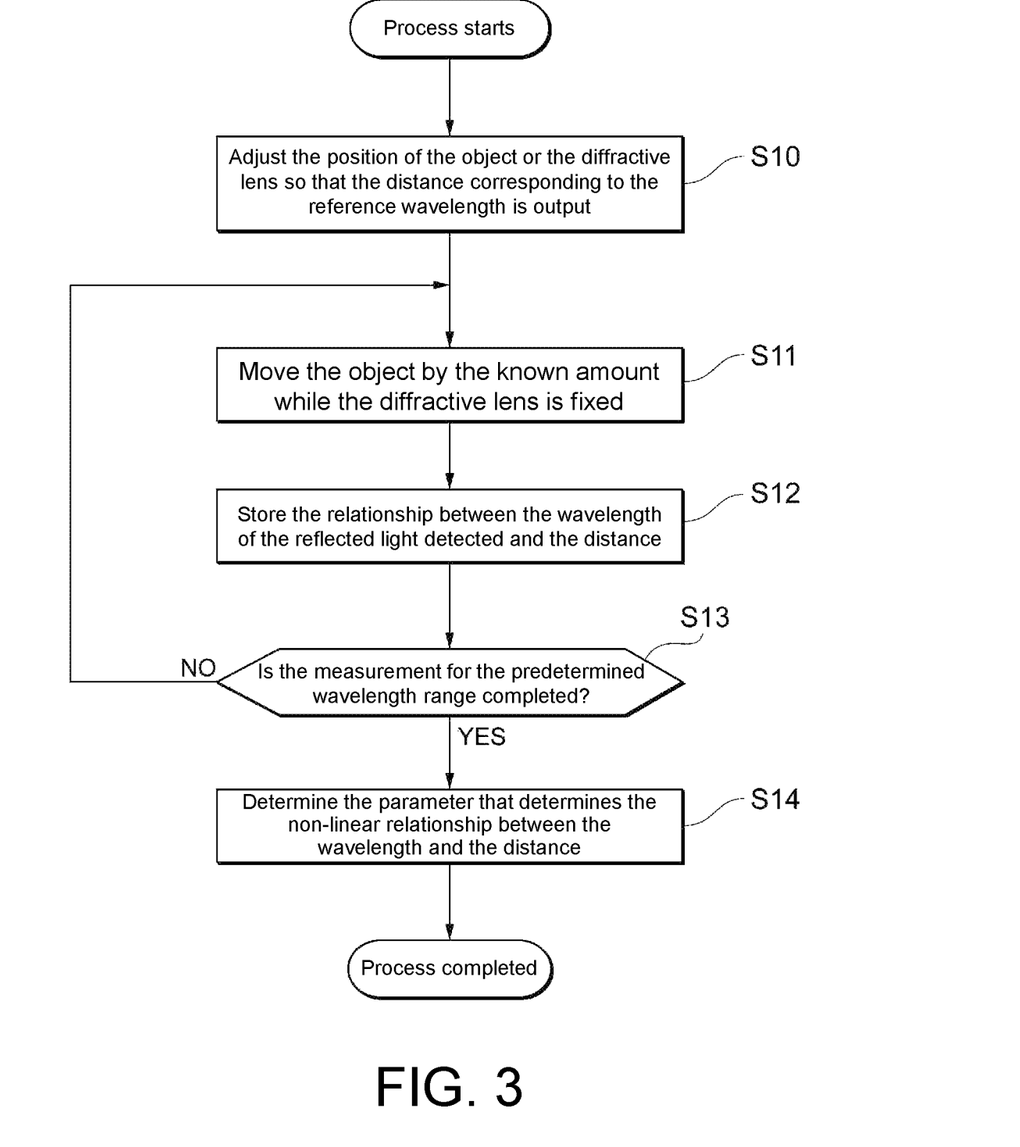
FIG. 3 is a flowchart showing an initial setting process of the confocal sensor according to the present embodiment.

FIG. 3 is a flowchart showing an initial setting process of the confocal sensor 1 according to the present embodiment. The process shown in the figure is performed before the distance is measured by the confocal sensor 1.

First, the position of the object 200 or the diffractive lens 130 is adjusted so that a distance corresponding to the reference wavelength (or the reference wavelength in the setting at the time of adjustment) is output by the confocal sensor 1 (S10). Here, it is assumed that the reference wavelength and the focal length corresponding thereto are determined at the design stage.

Thereafter, the object 200 is moved by a known amount while the diffractive lens 130 is fixed (S11). The confocal sensor 1 stores the relationship between the wavelength of the reflected light detected in this case and the distance (S12). Here, the distance to the object 200 is calculated by adding (or subtracting) the distance obtained by moving the object 200 to the distance corresponding to the reference wavelength.

Then, it is determined whether the measurement of the relationship between the wavelength of the reflected light and the distance detected by the confocal sensor 1 is completed for the predetermined wavelength range (S13). For example, whether the measurement is completed may be determined based on whether the object 200 is moved by a predetermined plurality of known amounts.

If the measurement is not completed for the predetermined wavelength range (S13: NO), the process of moving the object 200 by the known amount (S11) and storing the relationship between the wavelength of the reflected light detected and the distance (S12) is repeated. On the other hand, if the measurement is completed for the predetermined wavelength range (S13: YES), a parameter that determines the non-linear relationship between the wavelength and the distance is determined (S14). That is, the parameter (L2, $\lambda_0$, $f_0$) that specifies the non-linear relationship between the wavelength $\lambda$ of the reflected light and the distance L1 from the diffractive lens 130 to the object 200, represented by the formula (2), is determined.

Such a process may be repeated by changing the distance $L_2$ from the pinhole 120 to the diffractive lens 130. The process for initial setting is completed through the above.

By performing the above process, the measuring unit 40 may measure the distance from the diffractive lens 130 to the object 200 according to the non-linear relationship estimated based on the measured values of the wavelength of the reflected light and the distance from the diffractive lens 130 to the object 200. Thereby, the non-linear relationship between the wavelength of the reflected light and the distance from the diffractive lens 130 to the object 200 can be corrected based on the measured values, and the distance from the diffractive lens 130 to the object 200 can be measured more accurately.

Figure 4:
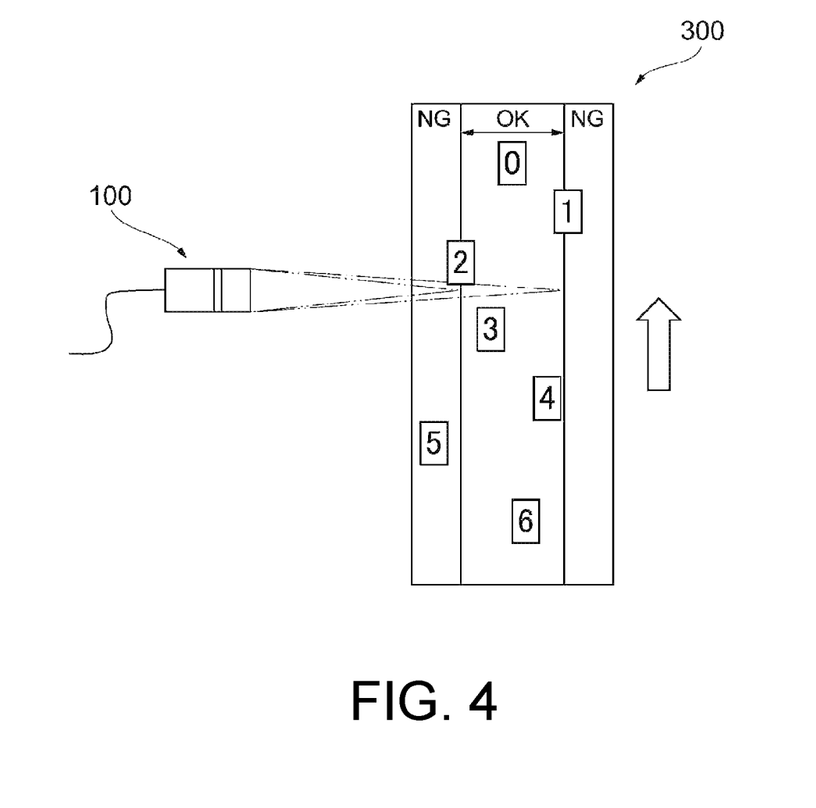
FIG. 4 is a diagram showing an outline of determining whether the object is located within a predetermined range performed by the confocal sensor according to the present embodiment.

FIG. 4 is a diagram showing an outline of determining whether the object 200 is located within a predetermined range performed by the confocal sensor 1 according to the present embodiment. The figure shows a case where the sensor head 100 determines whether a workpiece transferred by a conveyor 300 is located in a predetermined range. The figure shows seven workpieces transferred by the conveyor 300. The workpieces are numbered from 0 to 6 in order from the downstream of the conveyor 300. The "predetermined range" in this example is the range indicated as "OK" in the figure, and is a central belt of the conveyor 300. On the other hand, a range corresponding to a side belt of the conveyor 300, indicated as "NG" in the figure, is outside the "predetermined range."

In determining whether the workpiece is located within the predetermined range, the distance L2 from the pinhole 120 to the diffractive lens 130 of the confocal sensor 1 is adjusted so that at least the range indicated as "OK" is included in the measuring range. Then, the initial setting described later is performed, and the measuring unit 40 of the confocal sensor 1 determines whether the object is located within the predetermined range based on the wavelength of the reflected light.

Figure 5:
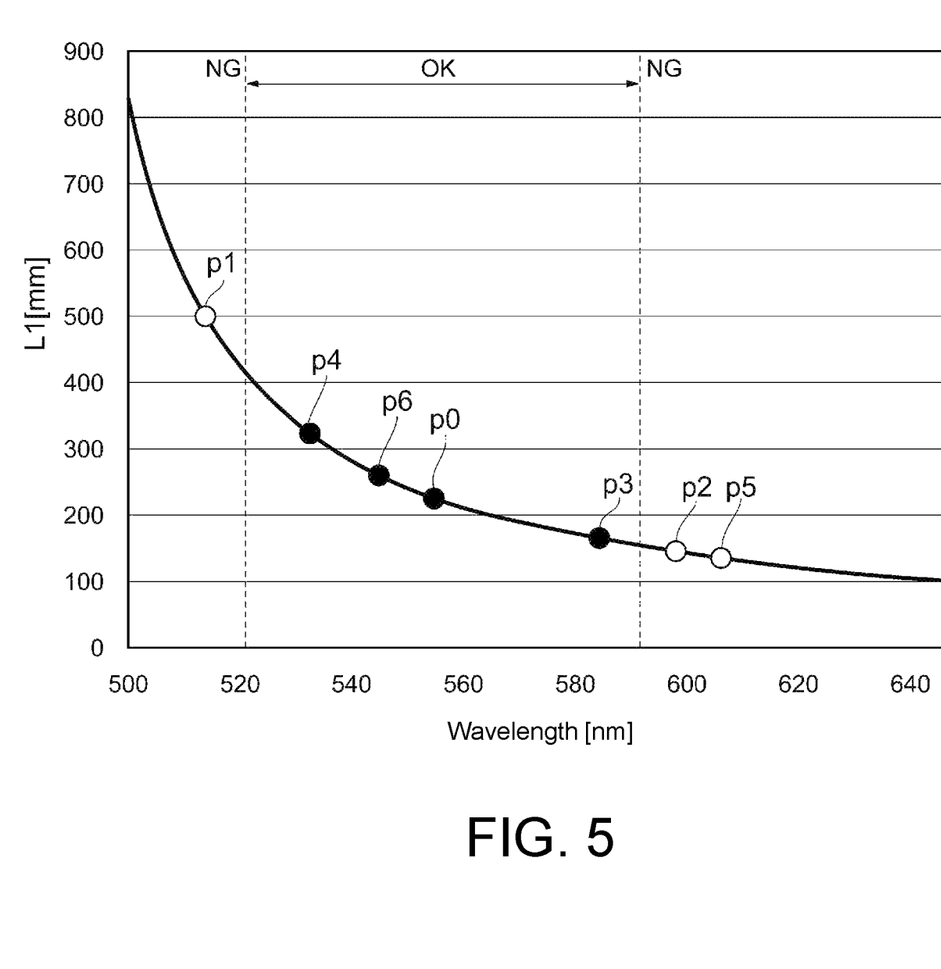
FIG. 5 is a diagram showing a relationship between the distance from the diffractive lens to the object and the wavelength of the reflected light and a determination result of the confocal sensor according to the present embodiment.

FIG. 5 is a diagram showing a relationship between the distance L1 from the diffractive lens 130 to the object 200 and the wavelength of the reflected light and a determination result of the confocal sensor 1 according to the present embodiment. In the figure, the distance L1 from the diffractive lens 130 to the object 200 is shown on the vertical axis in mm, and the wavelength of the reflected light is shown on the horizontal axis in nm.

The figure shows measurement points p0 to p6 corresponding to the workpieces numbered from 0 to 6 in order from the downstream of the conveyor 300. Further, the figure shows the wavelength range corresponding to the range indicated as "OK" and the wavelength range corresponding to the range indicated as "NG."

According to the figure, the workpieces corresponding to the measurement points p0, p3, p4, and p6 are located within the predetermined range. However, the workpieces corresponding to the measurement points p1, p2, and p5 are not located within the predetermined range.

The measuring unit 40 may compare the measured wavelength with the upper and lower limits of the wavelength range corresponding to the predetermined range to determine whether the object is located within the predetermined range. In this way, whether the position of the object is appropriate can be determined.

Figure 6:
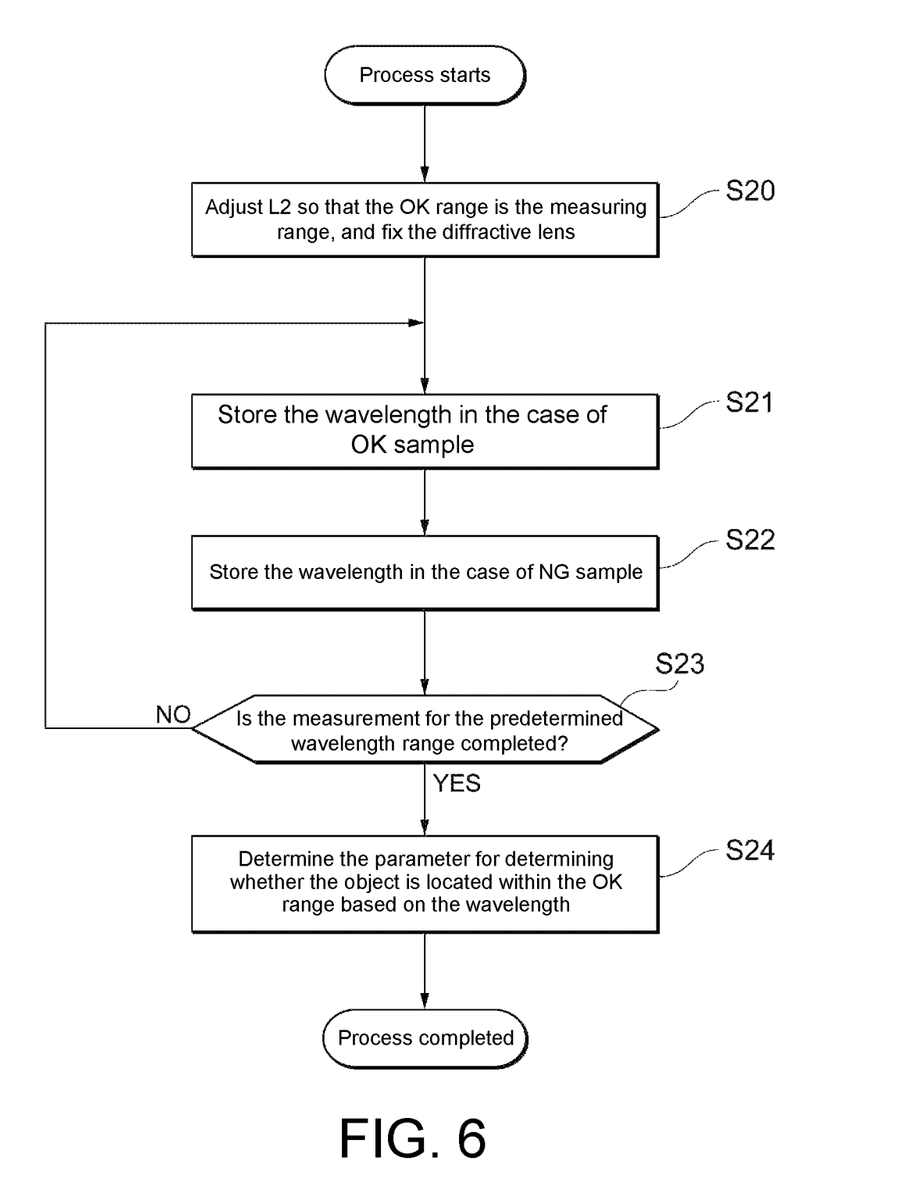
FIG. 6 is a flowchart showing an initial setting process of the confocal sensor according to the present embodiment.

FIG. 6 is a flowchart showing an initial setting process of the confocal sensor 1 according to the present embodiment. The process shown in the figure is performed before determining whether the object is located within the predetermined range.

First, the distance L2 from the pinhole 120 to the diffractive lens 130 is adjusted so that the OK range is the measuring range, and the diffractive lens 130 is fixed (S20).

Thereafter, the conveyor 300 is moved to flow the sample workpieces. The sample workpieces are placed in the range indicated as "OK" (OK range) in FIG. 4 or in the range indicated as "NG" (NG range). The sample placed in the OK range is called an OK sample, and the sample placed in the NG range is called an NG sample.

The confocal sensor 1 stores the wavelength when the OK sample is measured (S21), and stores the wavelength when the NG sample is measured (S22).

Then, it is determined whether the association between the wavelength of the reflected light detected by the confocal sensor 1 and OK or NG is completed for the predetermined wavelength range (S23). For example, whether the measurement is completed may be determined based on whether the measurement is completed for a predetermined plurality of samples.

If the measurement is not completed for the predetermined wavelength range (S23: NO), the process of storing the wavelength when the OK sample is measured (S21) and the process of storing the wavelength when the NG sample is measured (S22) are repeated. On the other hand, if the measurement is completed for the predetermined wavelength range (S23: YES), a parameter for determining whether the object is located within the OK range is determined based on the wavelength. The process for initial setting is completed through the above.

Figure 7:
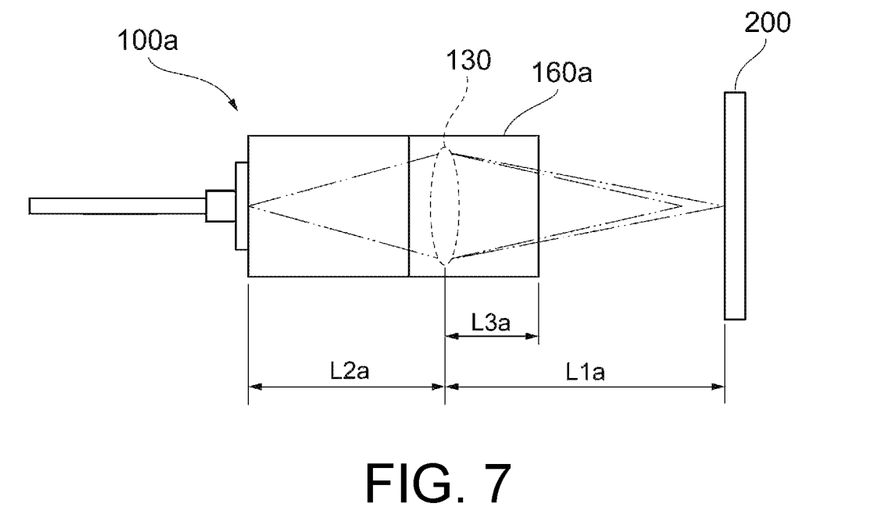
FIG. 7 is a diagram showing an outline when a first holder is attached to a sensor head according to a modified example of the present embodiment.
Figure 8:
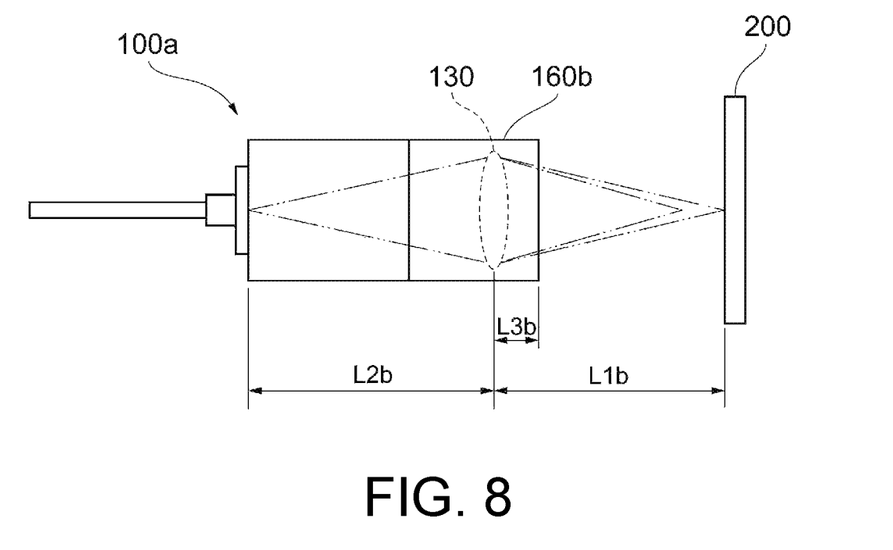
FIG. 8 is a diagram showing an outline when a second holder is attached to a sensor head according to a modified example of the present embodiment.

FIG. 7 is a diagram showing an outline when a first holder 160a is attached to a sensor head 100a according to a modified example of the present embodiment. Further, FIG. 8 is a diagram showing an outline when a second holder 160b is attached to the sensor head 100a according to a modified example of the present embodiment. In the sensor head 100a according to the modified example, multiple types of holders (first holder 160a and second holder 160b) for housing the diffractive lens 130 at different positions can be replaced.

When the first holder 160a is attached to the sensor head 100a, the distance from the diffractive lens 130 to the object 200 is L1a, and the distance from the pinhole 120 to the diffractive lens 130 is $L_2a$. Here, the distance $L_2a$ from the pinhole 120 to the diffractive lens 130 is known as a design value of the first holder 160a. The measuring unit 40 calculates the distance L1a from the diffractive lens 130 to the object 200 according to the formula (2) when the distance from the pinhole 120 to the diffractive lens 130 is $L_2a$. When calculating the distance from the front surface of the sensor head 100a to the object 200, a distance L3a from the diffractive lens 130 to the front surface of the sensor head 100a may be subtracted from the distance L1a from the diffractive lens 130 to the object 200. Here, the distance L3a from the diffractive lens 130 to the front surface of the sensor head 100a is a value obtained by subtracting the distance $L_2a$ from the pinhole 120 to the diffractive lens 130 from a total length L of the sensor head 100a.

When the second holder 160b is attached to the sensor head 100a, the distance from the diffractive lens 130 to the object 200 is L1b, and the distance from the pinhole 120 to the diffractive lens 130 is L2b. Here, the distance L2b from the pinhole 120 to the diffractive lens 130 is known as a design value of the first holder 160a. The measuring unit 40 calculates the distance L1b from the diffractive lens 130 to the object 200 according to the formula (2) when the distance from the pinhole 120 to the diffractive lens 130 is L2b. When calculating the distance from the front surface of the sensor head 100a to the object 200, a distance L3b from the diffractive lens 130 to the front surface of the sensor head 100a may be subtracted from the distance L1b from the diffractive lens 130 to the object 200.

In this way, the measuring range can be changed stepwise by replacing multiple types of holders. In the case of this example, since L2a<L2b, when the first holder 160a is attached, the measuring range becomes wider as compared with the case where the second holder 160b is attached. On the other hand, when the second holder 160b is attached, the measurement accuracy becomes higher in the low wavelength region as compared with the case where the first holder 160a is attached.

Figure 9:
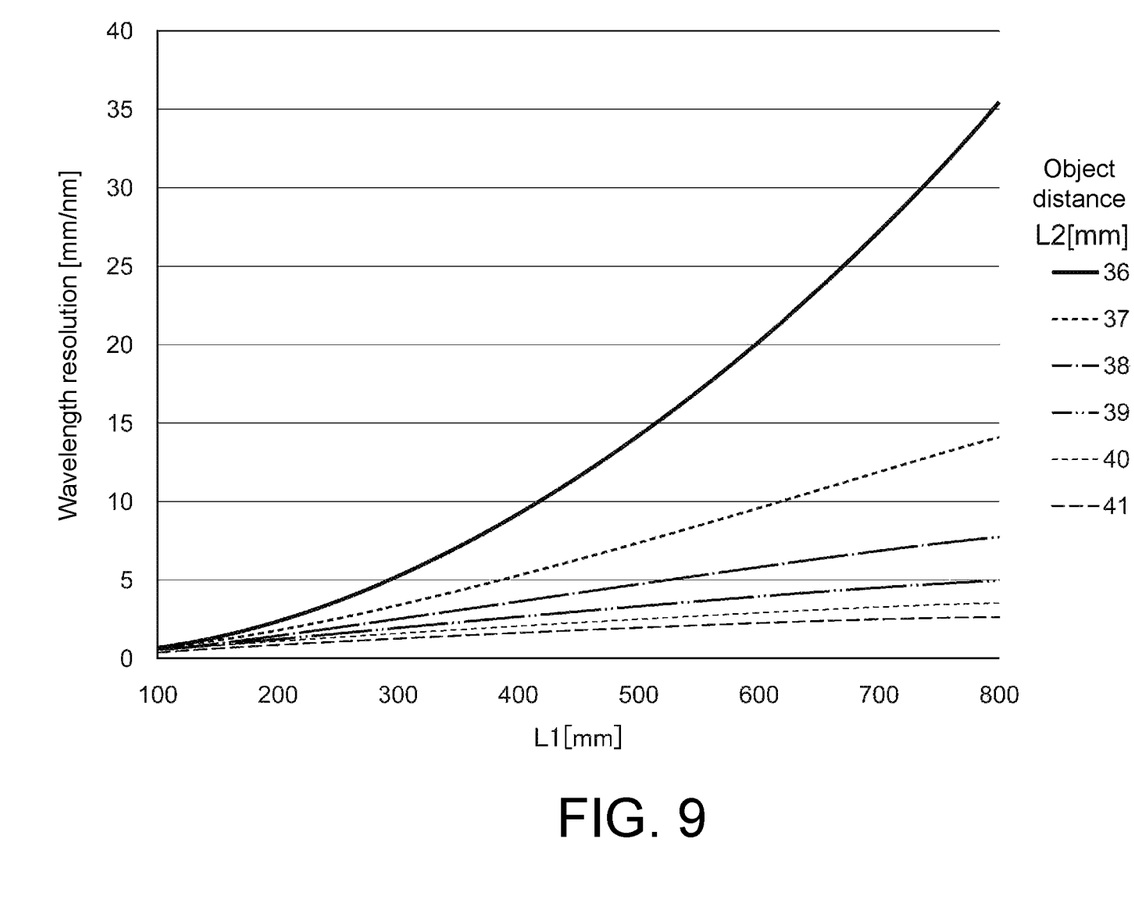
FIG. 9 is a diagram showing a relationship between a wavelength resolution and the distance from the diffractive lens to the object of the confocal sensor according to the present embodiment.

FIG. 9 is a diagram showing a relationship between the wavelength resolution of the confocal sensor 1 according to the present embodiment and the distance L1 from the diffractive lens 130 to the object 200. In the figure, the wavelength resolution is shown on the vertical axis in mm/nm, and the distance L1 from the diffractive lens 130 to the object 200 is shown on the horizontal axis in mm. Further, in the figure, the case where the distance L2 from the pinhole 120 to the diffractive lens 130 is 36 mm is shown by a solid line, the case of L2=37 mm is shown by a broken line, the case of L2=38 mm is shown by a one-dot chain line, the case of L2=39 mm is shown by a two-dot chain line, the case of L2=40 mm is shown by a dotted line, and the case of L2=41 mm is shown by a long broken line. The wavelength resolution means that as the resolution increases, the distance to the object 200 can be measured more accurately.

According to the figure, it can be read that as the distance L1 from the diffractive lens 130 to the object 200 becomes longer, the value of the wavelength resolution increases (the resolution decreases). Further, when the distance L1 from the diffractive lens 130 to the object 200 is fixed, it can be read that as the distance L2 from the pinhole 120 to the diffractive lens 130 becomes longer, the value of the wavelength resolution decreases (the resolution increases).

The confocal sensor 1 may further include an input unit that accepts input of the wavelength resolution required by the user, and an output unit that outputs ranges of the distance L1 from the diffractive lens 130 to the object 200 and the distance L2 from the pinhole 120 to the diffractive lens 130 that satisfy the required wavelength resolution. The input unit may include, for example, a push button, and the output unit may include, for example, a 7-segment display unit or a liquid crystal display device. The confocal sensor 1 may store the relationship shown in FIG. 9 in a storage unit to calculate the ranges of the distance L1 from the diffractive lens 130 to the object 200 and the distance L2 from the pinhole 120 to the diffractive lens 130 that satisfy the required wavelength resolution. Thereby, while achieving the required wavelength resolution, it is possible to grasp in what range the diffractive lens 130 can be moved or the positional relationship between the object 200 and the sensor head 100 can be changed.

Further, the confocal sensor 1 may accept the input of the wavelength resolution required by the user and the input of the linearity required by the user, and output the ranges of the distance L1 from the diffractive lens 130 to the object 200 and the distance L2 from the pinhole 120 to the diffractive lens 130 that satisfy the required wavelength resolution and the required linearity. The confocal sensor 1 may store the relationship shown in FIG. 9 in the storage unit to calculate the ranges of the distance L1 from the diffractive lens 130 to the object 200 and the distance L2 from the pinhole 120 to the diffractive lens 130 that satisfy the required wavelength resolution and the required linearity. Thereby, while achieving the required wavelength resolution and the required linearity, it is possible to grasp in what range the diffractive lens 130 can be moved or the positional relationship between the object 200 and the sensor head 100 can be changed.

With reference to the output values of L1 and L2, the user adjusts the distance L1 from the diffractive lens 130 to the object 200 and the distance L2 from the pinhole 120 to the diffractive lens 130 to measure the distance to the object 200. Thereby, for example, when control is performed to gradually bring the sensor head 100 close to the object 200, adjustment from a coarse adjustment to a highly accurate adjustment can be performed.

Figure 10:
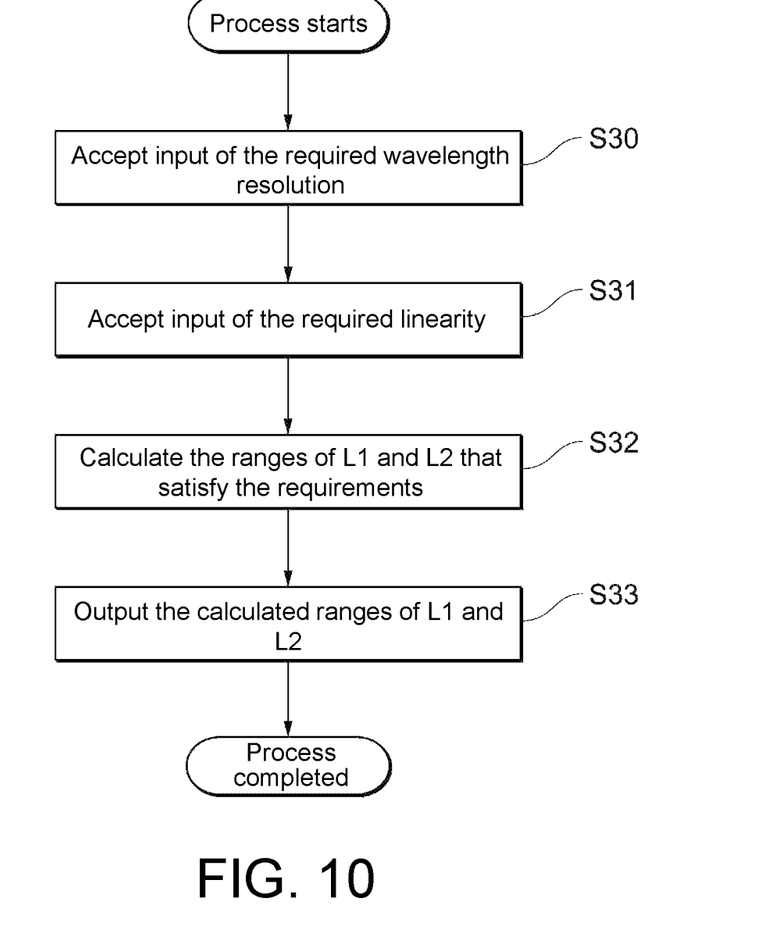
FIG. 10 is a flowchart showing a distance calculation process of the confocal sensor according to the present embodiment.

FIG. 10 is a flowchart showing a distance calculation process of the confocal sensor 1 according to the present embodiment. First, the confocal sensor 1 accepts input of the wavelength resolution required by the user (S30). Further, the confocal sensor 1 accepts input of the linearity required by the user (S31).

Thereafter, the confocal sensor 1 calculates the ranges of the distance L1 from the diffractive lens 130 to the object 200 and the distance L2 from the pinhole 120 to the diffractive lens 130 that satisfy the required wavelength resolution and the required linearity (S32). Finally, the confocal sensor 1 outputs the calculated ranges of the distance L1 from the diffractive lens 130 to the object 200 and the distance L2 from the pinhole 120 to the diffractive lens 130 (S33). The distance calculation process is completed through the above.

The embodiments described above are for facilitating the understanding of the invention, and are not for limiting and interpreting the invention. Each element included in the embodiments and the arrangement, material, condition, shape, size, etc. thereof are not limited to those exemplified, and can be changed as appropriate. In addition, the configurations shown in different embodiments can be partially replaced or combined.

[Appendix 1]

A confocal sensor (1) includes:
a light source (10) that emits light at a plurality of wavelengths;
a diffractive lens (130) that generates a chromatic aberration with respect to the light along an optical axis direction and converges the light on an object (200) without another intervening lens;
a pinhole (120) through which reflected light passes, the reflected light being a portion of the light focused on and reflected by the object (200) and converged by the diffractive lens (130); and
a measuring unit (40) that measures a distance from the diffractive lens (130) to the object (200) based on a wavelength of the reflected light,
wherein a distance from the pinhole (120) to the diffractive lens (130) is variable.

What is claimed is:
1. A confocal sensor, comprising:
a light source that emits light at a plurality of wavelengths;
a diffractive lens that generates a chromatic aberration with respect to the light along an optical axis direction and converges the light on an object without another intervening lens;
a pinhole through which reflected light passes, the reflected light being a portion of the light focused on and reflected by the object and converged by the diffractive lens; and
a measuring unit that measures a distance from the diffractive lens to the object based on a wavelength of the reflected light, wherein a distance from the pinhole to the diffractive lens is variable.

2. The confocal sensor according to claim 1, further comprising a mechanism that continuously changes the distance from the pinhole to the diffractive lens.

3. The confocal sensor according to claim 2, wherein the measuring unit measures the distance from the diffractive lens to the object according to a non-linear relationship between the wavelength of the reflected light and the distance from the diffractive lens to the object.

4. The confocal sensor according to claim 1, wherein a plurality of types of holders for housing the diffractive lens at different positions are replaceable.

5. The confocal sensor according to claim 4, wherein the measuring unit measures the distance from the diffractive lens to the object according to a non-linear relationship between the wavelength of the reflected light and the distance from the diffractive lens to the object.

6. The confocal sensor according to claim 1, wherein the measuring unit measures the distance from the diffractive lens to the object according to a non-linear relationship between the wavelength of the reflected light and the distance from the diffractive lens to the object.

7. The confocal sensor according to claim 6, wherein when the wavelength of the reflected light is represented by $\lambda$, the distance from the diffractive lens to the object is represented by L1, the distance from the pinhole to the diffractive lens is represented by L2, and a focal length of the diffractive lens with respect to a reference wavelength $\lambda_0$ is represented by $f_0$, the non-linear relationship is represented by:

$$L_1 = \frac{\lambda_0 f_0 L_2}{L2\lambda - f_0 \lambda_0}. \quad \text{[Formula 1]}$$

8. The confocal sensor according to claim 7, wherein the measuring unit measures the distance from the diffractive lens to the object according to the non-linear relationship estimated based on measured values of the wavelength of the reflected light and the distance from the diffractive lens to the object.

9. The confocal sensor according to claim 6, wherein the measuring unit measures the distance from the diffractive lens to the object according to the non-linear relationship estimated based on measured values of the wavelength of the reflected light and the distance from the diffractive lens to the object.

10. The confocal sensor according to claim 1, wherein the measuring unit determines whether the object is located within a predetermined range based on the wavelength.

11. The confocal sensor according to claim 1, further comprising:

an input unit that accepts input of a wavelength resolution required; and an output unit that outputs ranges of the distance from the diffractive lens to the object and the distance from the pinhole to the diffractive lens that satisfy the wavelength resolution.

\* \* \* \* \*